July 29, 1958 — L. E. HASKELL ET AL — 2,845,470
STORAGE BATTERY
Filed Nov. 26, 1954 — 2 Sheets-Sheet 1

LLOYD E. HASKELL &
CLIFFORD W. MELL
INVENTORS

BY A. B. Bowman

ATTORNEY

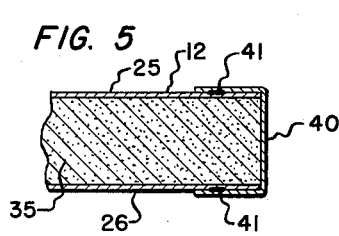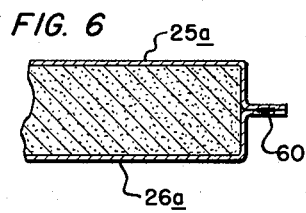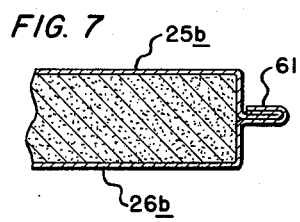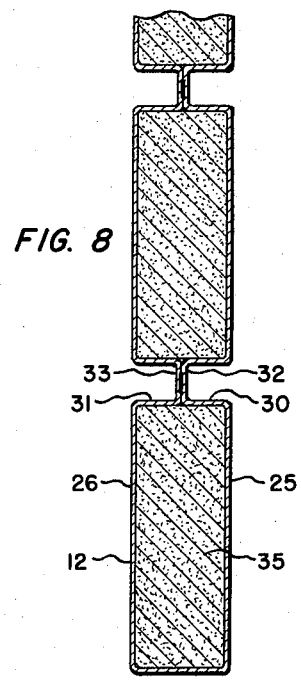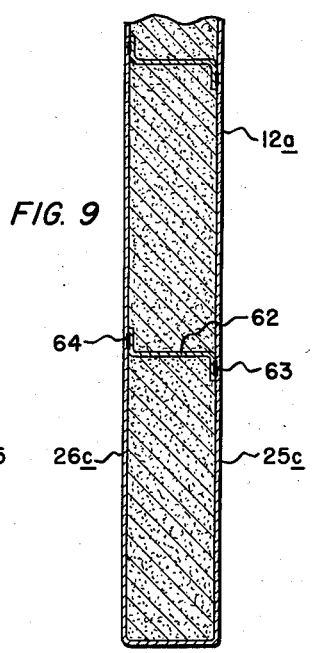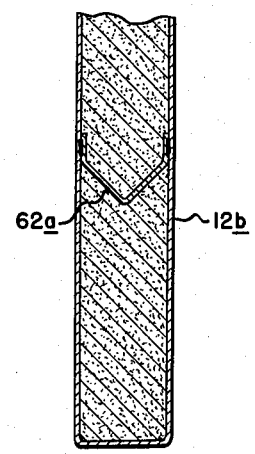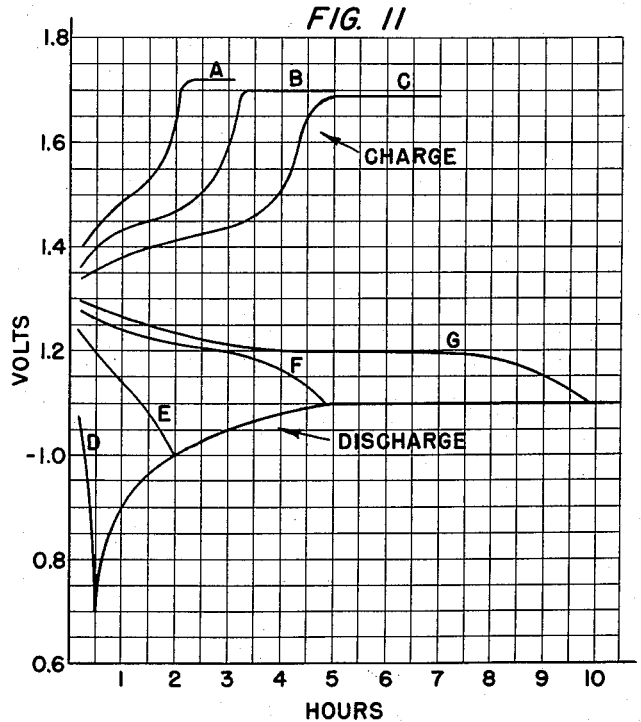

United States Patent Office 2,845,470
Patented July 29, 1958

2,845,470

STORAGE BATTERY

Lloyd E. Haskell, El Centro, and Clifford W. Mell, Los Angeles, Calif.

Application November 26, 1954, Serial No. 471,315

7 Claims. (Cl. 136—45)

This invention relates to electrodes for electrolytic devices such as storage batteries, electrical accumulators and the like.

By reason of the nature of the electro-chemical reactions of which the electrode plate is the seat, most manufacturers of alkaline storage batteries make the plate, which is the essential part of the cell, of small pockets or tubes made of perforated band steel to contain the active material, said pockets or tubes being juxtaposed in layers and having their extremities firmly seated in a rigid frame of sheet-steel. A storage plate may therefore be characterized from a strictly electrical point of view by the placing in parallelism, by means of a frame, of a plurality of small pockets or tubes which are juxtaposed in layers.

The cell of an alkaline storage battery generally comprises a plurality of plates, those of the same polarity being always interconnected by means which shall insure their being connected in parallel from an electrical point of view. The collector means which makes of the plates an integral whole both from a mechanical and an electrical point of view is generally located at the top of the frame where there is provided for this purpose an appendage called "frame-head" or "plate-head."

These general characteristics of construction, which have been adopted by most manufacturers of alkaline storage batteries strictly limit the available energy of the alkaline cell for the following reasons:

(a) The available energy of the constituent of the plate (small pocket or tube) is limited. In the elementary constituents of the plate (small pockets or tubes) the reception and the emission of the current are insured by the perforated conductive walls of band steel of said pockets or tubes, and it is evident that the section of these conductive parts must be proportioned to the intensity of the current which passes through them. However, when for example the storage battery must be discharged in a very short time an increase in the section of said band steel offers insurmountable obstacles. In practice, in order to insure accurate operation of the pocket or tube, the manufacturer is compelled to work out his constituent parts while keeping his dimension figures within certain limits as regards thickness, width and length, these being apreciably the same in the case of all manufacturers. These maximum dimensions closely limit the useful energy of the pocket or tube.

(b) In a conventional plate the number of small pockets or tubes juxtaposed in layers cannot be increased indefinitely. The electrical operation of the plate is insured by means of the frame which distributes the charging current and collects the discharging current emanating from the small pockets or tubes. The frame being necessarily made of thin band steel, and consequently of poor electrical conductivity, because of construction requirements (bulk, weight) can offer the electric current but a very limited section for its passage. As a result it is absolutely necessary to confine a conventional plate to a relatively small number of small pockets or tubes seated in the same frame in order to avoid inadmissible drops in the voltage and a rise in temperature incompatible with accurate operation of the plate.

(c) In a cell the number of conventional plates electrically connected in parallel must be limited. The device which insures the connection between the plates so that they shall be electrically connected in parallel consists in practice of a steel member called a junction. In order to avoid the same objections as those described under (b) above, the manufacturer must limit the number of plates to be connected to each other.

It is believed that from the above it will be clear that the standard principles of construction of alkaline cells as set forth above, considering the maximum possibilities to be expected from the component parts of the cell (small pockets or tubes, frame, plate and junction device) will not permit the practical realization of an alkaline cell having a capacity superior to about 1000 ampere hours.

Our present invention avoids all of the above specified objectionable features inherent to the principles of construction heretofore used, and the invention has for its object among other things to provide plates for a storage battery cell having the greatest possible power for the smallest possible bulk.

The cell to which the present invention relates comprises a series of positive and negative plates of the greatest possible dimensions compatible with a satisfactory and efficient operation, and it is another object of the invention to provide such a cell.

Another object of this invention is to provide a storage battery and electrodes or plates therefor, the plates being of novel, unitary structure.

Yet another object of this invention is to provide an electrode plate which is extremely simple in construction, yet highly efficient in operation, and which is adapted to be manufactured economically on a quantity basis.

Other objects and advantages of this invention it is believed will be readily apparent from the following detailed description of preferred embodiments thereof when read in connection with the accompany drawings.

In the drawings:

Figure 5 is a sectional elevation taken substantially on the line 5—5 of Figure 2.

Figure 6 is a sectional view similar to Figure 5, but illustrating a modified form of the invention.

Figure 7 is a sectional view similar to Figure 5, but illustrating a further modified form of the invention.

Figure 8 is a sectional elevation taken substantially on the line 8—8 of Figure 2.

Figure 9 is a sectional view similar to Figure 8 but illustrating a modified form of the invention.

Figure 10 is a sectional view similar to Figure 8 but illustrating a further modified form of the invention.

Figure 11 is a graph comprising a series of curves illustrating typical change and discharge characteristics of a cell including the negative and positive plates of this invention.

Figure 1:
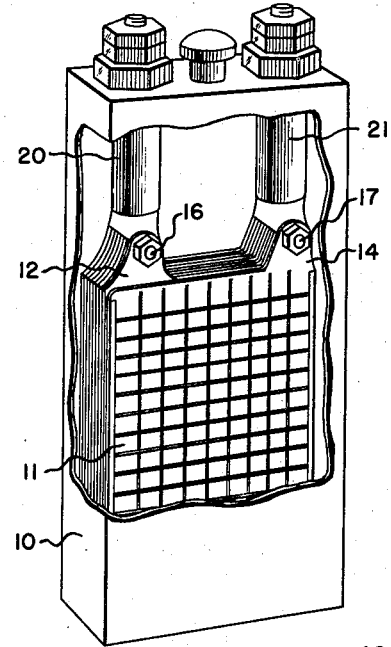
Figure 1 is a perspective view, partly broken away, illustrating a storage battery constructed in accordance with the invention.

Referring now to the drawings, the invention is shown as embodied in an alkaline type storage battery having a conventional rectangular casing 10 in which is contained the required number of alternately positioned positive and negative plates 11 and 12, respectively, each of the plates being provided with an upwardly protruding frame head 14. Each frame head is provided with an aperture 15 through one series of which a collector bolt 16 extends and through the other series of which the collector bolt 17 extends, the bolts connecting the negative plates together and the positive plates together, as well as to the negative and positive terminals 20 and 21, respectively.

One of the features of the invention resides in the fact that both the positive and negative plates are identical in structure. Accordingly, only one of the positive plates 12 will be described in detail. As shown in the drawings, the plate 12 consists basically of front and rear walls 25 and 26 formed of a single sheet of low carbon sheet steel, such as ingot iron. Other metals or alloys having a low electrical resistance, such as titanium or nickel, which are not adversely affected by the alkaline electrolyte may be used. The sheet forming the walls 25 and 26 is provided with a plurality of minute perforations 27 to provide proper contact between the electrolyte and the active material contained within the plates. The number of perforations is preferably about 2500 per square inch of the sheet. From the description thus far it will be understood to those skilled in the art that providing the perforated walls of the plate in the form of single, integral sheets is an important feature of the invention. Such a structure is a decided improvement over the conventional plates which comprise a plurality of small pieces of perforated metal mechanically held together and which thus include a plurality of poor electrical connections.

The thickness of the sheet metal which forms the front and rear walls 25 and 26 is varied as required for conducting the flow of current, and depending upon the required rigidity of the plate and particular type of service in which the battery is employed. As a specific example, sheet metal 0.0025 inch in thickness is used for plates 6 by 6 inches in size.

It is preferred to nickel-plate the sheet material to prevent the formation of rust or corrosion while the plates are under construction.

As shown best in Figure 8, the front and rear walls are provided with spaced horizontal, opposed grooves 30 and 31, the portions 32 and 33 of the walls forming the bottoms of the grooves being in mutual contact and seam welded or otherwise bonded together to form a plurality of horizontal pockets for the reception of the active material 35, thus preventing vertical shifting and displacement thereof. The size of the pockets for the active material may be varied within wide limits, it being understood that as the number of pockets is increased, with given plate dimensions, the wall surface is increased, resulting in faster charge and discharge. Additionally, as the number of pockets is decreased, the amount of active material is increased, resulting in higher amperage. As an example, for a 6 by 6 inch plate, the pockets are 1/8-inch thick by 3/8-inch high.

The open sides of the plate 12 are closed by means of elongated strips 40 suitably crimped as shown in Fig. 5 and seam welded as at 41 or otherwise bonded to the front and rear walls to form a stiff frame for the plate sides. If desired, the strips 40 may simply be suitably crimped to secure the same to the front and rear walls.

Figure 4:
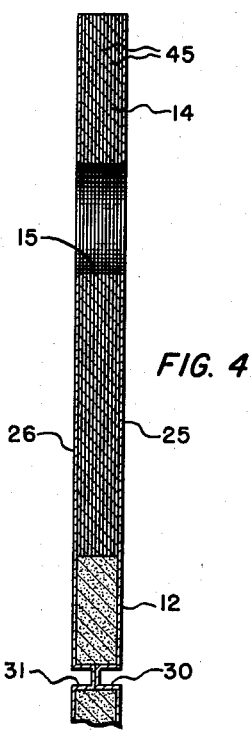
Figure 4 is a sectional elevation taken substantially on the line 4—4 of Figure 2.

The frame head 14 is formed, as shown best in Figure 4, of a continuation of the front and rear walls, between which is provided a plurality of suitably shaped plates 45 preferably of a thickness two to three times greater than that of the sheet forming the walls, thus providing an adequately stiffened and conductive member for support of the plate and conduction of the current to the terminal post.

Figure 2:
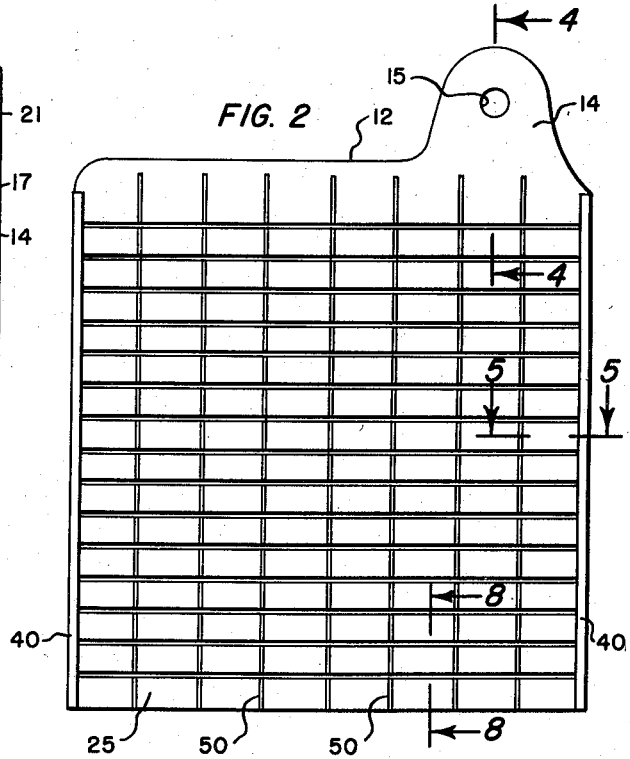
Figure 2 is a front elevation of one of the plates of this invention.
Figure 3:
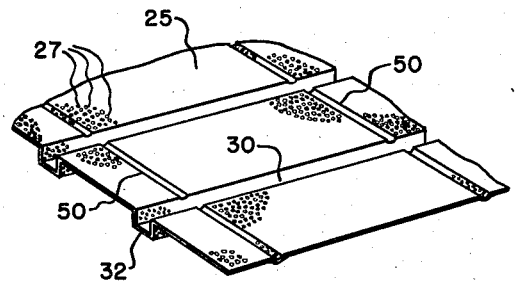
Figure 3 is a fragmentary perspective view illustrating one of the plate walls.

As shown in Figures 2 and 3, it is preferred to provide the front and rear walls with a plurality of vertical, shallow grooves 50 which function to increase the rigidity and stiffness of the plates, and also to receive the nonconducting plate separators (not shown) which are placed between the assembled plates.

From the above description it will be understood that a plate of great simplicity and efficiency has been provided. As has been indicated, the plate of this invention does not depend upon uncertain mechanical joints to carry heavy charges and heavy discharges of electricity to and from the bolts or mounting posts throughout the length and width of the plate. Since the sides of the plate of this invention are of unbroken, integral construction from side to side and top to bottom, this great weakness of the conventional plate in electrical losses and heating effects has been overcome.

Typical charge and discharge characteristics of a cell constructed as described above are illustrated by the curves of Figure 11, wherein voltage is plotted against time in hours. Curves A, B and C represent voltage curves when cells constructed with the plates of this invention are completely charged during periods of 3 hours, 5 hours and 7 hours, respectively. Curves D, E, F and G illustrate the voltage characteristics when the cell is completely discharged in periods of 1/2-hour, 5 hours and 10 hours, respectively.

In use of the plates in an alkaline type battery as described, the electrolyte is a conventional aqueous solution of potassium hydroxide having a specific gravity of 1.2. Other alkaline materials such as sodium hydroxide may be used, as is readily apparent to those skilled in the art. The active material in the positive plate is the conventional mass of nickel hydrate, the negative plate being filled with a mass of cadmium oxide and iron oxide, all as is familiar to those skilled in the art.

Figures 6 and 7 illustrate modified structures for forming the sides of the plate. In the structure of Figure 6, the strips 40 are dispensed with, the front and rear walls 25a and 26a simply being crimped together along the sides thereof and seam welded as at 60. In the structure of Figure 7, the front and rear walls 25b and 26b are crimped together and then bent double to form a reinforced side 61 and to dispense with the necessity for welding or other fastening means.

The plate 12a illustrated in Figure 9 is similar to the plate 12 previously described except that the pockets for the active material are formed by means of horizontal spacer members 62 having vertical portions 63 and 64 welded to the front and rear walls 25c and 26c. Figure 10 illustrates a further modified form of plate 12b in which the spacer members 62a are generally V-shaped.

In the present application we have disclosed our invention as applied to the construction of the plates or electrodes. Those skilled in the art will appreciate that the invention may be applied to electrodes of various other types and to various other electrolytic devices without departing from the spirit and scope of our invention. It is therefore to be understood that our invention is not limited to the forms and methods specifically described in the foregoing specification, the description therein being given by way of example rather than by way of limitation and that our patent is not limited to the preferred forms described herein or in any manner other than by the scope of the appended claims.

We claim:

1. An electrode for alkaline type electric batteries comprising a pair of generally rectangular and flat unitary walls of relatively thin metal minutely perforated throughout their entire area, each wall being formed with a series of linear offsets providing ribs on the convex side and channels on the concave side, said offsets being parallel to each other and extending transversely of the wall, said walls being positioned with their edges coincident, the ribs on one wall coinciding in size and position with ribs on the other wall and being in mutual contact and secured together to hold the walls with portions thereof between the offsets in spaced apart substantially parallel relationship and the offsets providing barriers dividing the space between said walls into a plurality of pockets separated by said barriers for receiving an active electrolytic material, the channels being external of the assembled walls and adapted for occupancy and movement of electrolyte liquid.

2. An electrode of the character defined in claim 1 in which said ribs are secured together by seam welding.

3. An electrode of the character defined in claim 1 in which the walls comprise a single sheet of metal folded intermediate its ends.

4. An electrode of the character defined in claim 1 in which said walls are formed with mutually engaging generally flat vertical extensions secured together to form a unitary header forming a closure along the upper edge of the walls and adapted to receive a terminal member.

5. An electrode of the character defined in claim 1 in which said linear offsets extend horizontally and are so spaced apart vertically that said pockets are relatively elongated horizontally and relatively shallow vertically.

6. An electrode of the character defined in claim 5 in which the cross section of each pocket is generally hexagonal with its vertical parallel wall portions closely spaced relative to its vertical dimension.

7. An electrode of the character defined in claim 1 in which there is means closing off the ends of the pockets.

References Cited in the file of this patent

UNITED STATES PATENTS

| | | |
|---|---|---|
| 383,216 | Epstein | May 22, 1888 |
| 454,818 | Anderson | June 23, 1891 |
| 509,270 | Usher | Nov. 21, 1893 |
| 658,733 | Coleman | Sept. 25, 1900 |
| 674,501 | Gardiner | May 21, 1901 |
| 902,975 | Lake | Nov. 3, 1908 |
| 2,724,733 | Hagspihl et al. | Nov. 22, 1955 |

FOREIGN PATENTS

| | | |
|---|---|---|
| 7,762 | Sweden | Mar. 12, 1896 |
| 272,073 | Switzerland | June 4, 1949 |